US007475347B2

(12) United States Patent
Idei et al.

(10) Patent No.: US 7,475,347 B2
(45) Date of Patent: Jan. 6, 2009

(54) COMPUTER SYSTEM AND METHOD FOR REDUCING POWER CONSUMPTION OF STORAGE SYSTEM

(75) Inventors: Hideomi Idei, Yokohama (JP); Norifumi Nishikawa, Machida (JP); Kazuhiko Mogi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 419 days.

(21) Appl. No.: 11/482,337

(22) Filed: Jul. 7, 2006

(65) Prior Publication Data

US 2007/0250475 A1 Oct. 25, 2007

(30) Foreign Application Priority Data

Apr. 24, 2006 (JP) ............................. 2006-118870

(51) Int. Cl.
*G06F 15/00* (2006.01)
*G06F 13/00* (2006.01)
(52) U.S. Cl. .......................................... 715/700; 707/2
(58) Field of Classification Search ................. 715/700, 715/723, 763–765, 780–784, 840; 707/2, 707/5; 711/162, 114
See application file for complete search history.

(56) References Cited

U.S. PATENT DOCUMENTS

| 2003/0196037 A1* | 10/2003 | Obara et al. ................. 711/114 |
| 2004/0172512 A1* | 9/2004 | Nakanishi et al. ........... 711/162 |
| 2004/0193658 A1* | 9/2004 | Kawamura et al. .......... 707/202 |

FOREIGN PATENT DOCUMENTS

| JP | 09-282057 | 10/1997 |
| JP | 2000-293314 | 10/2000 |

* cited by examiner

*Primary Examiner*—Kevin Nguyen
(74) *Attorney, Agent, or Firm*—Sughrue Mion, PLLC

(57) ABSTRACT

A disk rotation control part for controlling the rotations of a plurality of disk devices is provided. The configuration is such that a disk of a disk device for which an access will not be generated is rotated at a second rate of speed, which is faster than 0, and slower than a first rate of speed, which is the rotation speed at access time. DB management information comprises information denoting which DB schema inside a DB is stored in which location. The disk rotation control part, based on a query plan of a query received by the DBMS, and DB management information, specifies the storage location of a DB schema to be accessed when this query is processed, and rotates a disk of the disk device comprising the specified storage location at a first rate of speed.

20 Claims, 10 Drawing Sheets

FIG. 2A

| LOGICAL UNIT NUMBER (200) | LOGICAL BLOCK ADDRESS (202) | PHYSICAL DISK NUMBER (204) | PHYSICAL BLOCK ADDRESS (206) |
|---|---|---|---|
| 0 | 0-199999 | 0 | 0-199999 |
|   | 200000-399999 | 1 | 0-199999 |
|   | 400000-599999 | 2 | 0-199999 |
|   | ⋮ | ⋮ | ⋮ |
| 1 | 0-199999 | 10 | 0-399999 |
|   | 200000-399999 | 11 | 0-399999 |
|   | 400000-599999 | 12 | 0-399999 |
|   | ⋮ | ⋮ | ⋮ |
| ⋮ | ⋮ | ⋮ | ⋮ |

STORAGE REGION MANAGEMENT INFORMATION ~156

FIG. 2B

| PHYSICAL DISK NUMBER (220) | ROTATIONAL STATE COUNT VALUE (222) |
|---|---|
| 0 | 1 |
| 1 | 0 |
| 2 | 1 |
| ⋮ | ⋮ |

DISK ROTATION MANAGEMENT INFORMATION ~158

FIG. 3

| RAW DEVICE FILENAME | STORAGE SYSTEM ADDRESS | LOGICAL UNIT NUMBER | LEAD LOGICAL BLOCK ADDRESS | NUMBER OF LOGICAL BLOCKS |
|---|---|---|---|---|
| /dev/rdsk/raw1 | 1000 | 0 | 0 | 67108864 |
| /dev/rdsk/raw2 | 1000 | 1 | 0 | 33554432 |
| /dev/rdsk/raw3 | 1000 | 2 | 0 | 33554432 |
| ... | ... | ... | ... | ... |

RAW DEVICE INFORMATION ~116

FIG. 5A

DB PROCESSING MANAGEMENT INFORMATION ~126
- DB SCHEMA LOCATION INFORMATION ~500
- DB PROCESSING INFORMATION ~520

FIG. 5B

DB SCHEMA LOCATION INFORMATION ~500

| SCHEMA ID (502) | DBMS ID (504) | SCHEMA TYPE (506) | DESTINATION STORAGE SYSTEM ADDRESS (508) | DESTINATION LOGICAL UNIT NUMBER (510) |
|---|---|---|---|---|
| 0 | 12 | TABLE | 1000 | 0 |
| 1 | 12 | TABLE | 1000 | 0 |
| 2 | 12 | INDEX | 1000 | 0 |
| ⋮ | ⋮ | ⋮ | ⋮ | ⋮ |

FIG. 5C

DB PROCESSING INFORMATION ~520

| DBMS ID (522) | QUERY ID (524) | SCAN ID (526) | ACCESS-TARGETED SCHEMA ID (528) | SCHEMA SIZE (530) | SCAN TYPE (532) |
|---|---|---|---|---|---|
| 12 | 114 | 0 | 0 | 4GB | TABLE SCAN |
| 12 | 114 | 1 | 1 | 2GB | INDEX SCAN |
| 12 | 114 | 1 | 2 | 500MB | INDEX SCAN |
| ⋮ | ⋮ | ⋮ | ⋮ | ⋮ | |

FIG. 5D

DISK INFORMATION ~128

| STORAGE SYSTEM ADDRESS (540) | DISK ROTATION START TIME (542) | AVERAGE PER-SECOND DATA TRANSFER RATE (544) |
|---|---|---|
| 1000 | 10 | 20MB |
| 1002 | 12 | 18MB |
| 1004 | 12 | 18MB |
| ⋮ | ⋮ | ⋮ |

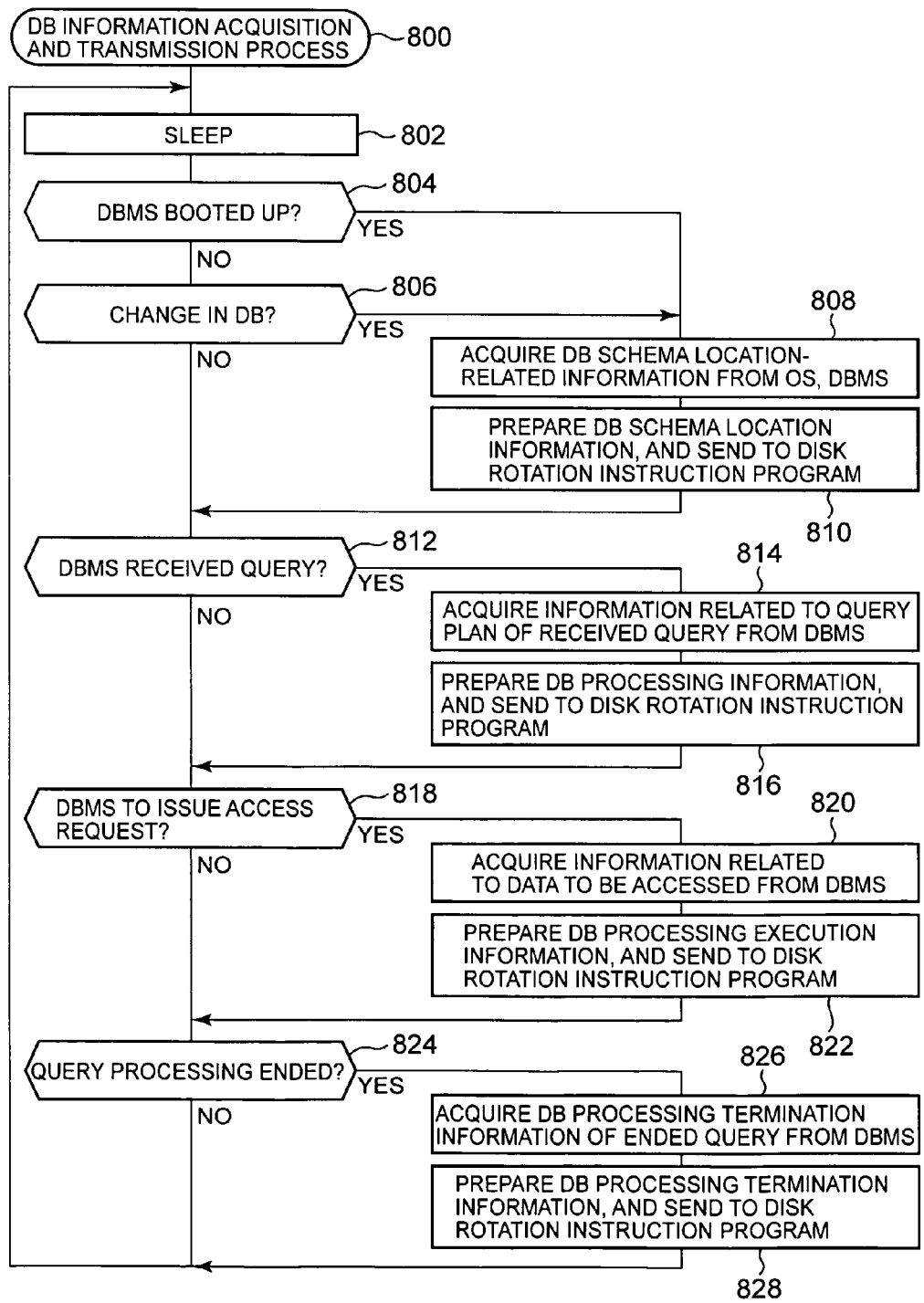

COMPUTER SYSTEM AND METHOD FOR REDUCING POWER CONSUMPTION OF STORAGE SYSTEM

CROSS-REFERENCE TO PRIOR APPLICATION

This application relates to and claims the benefit of priority from Japanese Patent Application No. 2006-118870, filed on Apr. 24, 2006, the entire disclosure of which is incorporated herein by reference.

BACKGROUND OF THE INVENTION

1. Field of the Invention

The present invention generally relates to storage technology and, more specifically, to technology for reducing the power consumption of a storage system, which stores a database (hereinafter "DB").

2. Description of the Related Art

Numerous DB-based applications exist today, and database management systems (hereinafter, "DBMS"), which perform sequential processing and management operations related to DB, have become extremely important. One characteristic feature of a DB is the fact that it handles large volumes of data. For this reason, in most computer systems that operate a DBMS (hereinafter, also referred to as a DB system), it is common to have a system configuration such that a storage system, which comprises a plurality of storage devices (in other words, a large capacity storage system), is connected to the computer that operates the DBMS (hereinafter, also referred to as a DB server), and stores DB data in this storage system.

As the amount of DB data is increasing, in line with this, the capacity of storage systems is also expanding. Storage devices mounted in a storage system, for example, include magnetic tape devices, and storage devices capable of loading a disk (for example, a hard disk and a DVD (Digital Versatile Disks) (hereinafter, abbreviated as a "disk device"). Usually, infrequently accessed data (for example, archived data) is being stored on magnetic tape devices, which are less expensive than disk devices. However, as disk devices becoming less costly, archived data and other infrequently accessed data is increasingly being stored on disk devices.

One method for increasing the capacity of a storage system is to increase the number of disk devices mounted thereto. However, because of the large amounts of power consumed by the rotating disk drives, the power consumption of the storage system as a whole increases due to the addition of more disk storage devices. Technology for controlling power consumption, for example, is disclosed in Japanese Laid-open Patent No. 9-282057 (hereinafter, Document 1) and Japanese Laid-open Patent No. 2000-293314 (hereinafter, Document 2).

The technology disclosed in Document 1 controls the power saving of a disk device (ON/OFF of power supply or selection of power saving mode) in a disk array system after the passage of a pre-established period of time following an access from a host machine. Further, if the power supply of the access destination disk device is OFF when there is an access from a host machine, access is executed subsequent to the power supply of this disk device being turned back ON.

The technology disclosed in Document 2 is technology for controlling the power supply of devices targeted for power supply control, which make up a computer system including peripheral equipment. A job is executed in a computer system, and a system power supply control device prepares a power supply control plan for each device targeted for power supply control based on a job execution plan and operational results, and, in accordance with the prepared power supply control plan, controls the power supply of the devices targeted for power supply control corresponding to the aforesaid power supply control plan.

As described hereinabove, because ever increasing numbers of disk devices are being mounted to storage systems configured for storing DB data, there is a need for technology for reducing the power consumption of such storage systems.

As technology for reducing the power consumption of a storage system, technology, which uses the technique disclosed in Document 1, for example, a technique whereby the power supply to a disk device is turned OFF, and when there is an access, the power supply to this access destination disk device is turned back ON, can be cited. However, one of the problems associated with this technique is that when a storage system receives a read request from a host machine, because the system is configured such that data is read out after the disk device power supply is turned back ON, the read response to the host machine becomes delayed.

Conversely, according to the technique disclosed in Document 2, because the computer system referred to in Document 2 corresponds to a DB system comprising a DB server and storage system, the devices targeted for power supply control are the DB server and storage system as a whole. For this reason, in the technology disclosed in Document 2, it is not possible to control the power supply of an individual disk device inside the storage system.

Even if the technology of Document 1 could be combined with the technology of Document 2, it would still not be possible to achieve both goals of reducing the power consumption of the entire storage system, and checking the degradation of the response rate of the storage system by controlling a disk device inside the storage system. This is because combining the technologies of Document 1 and Document 2 would only result in the power supply to the access destination disk drive being turned ON if it is OFF when the power supply to the storage system as a whole is ON, and an access is generated to the storage system.

SUMMARY OF THE INVENTION

Therefore, an aspect of the present invention achieves both the reduction of the power consumption of the entire storage system, and suppression of the degradation of the response rate of the storage system by controlling a disk device inside a storage system, which stores DB data.

A computer system according to an embodiment of the present invention comprises a storage system, a computer, and a disk rotation control part. The exemplary storage system comprises a plurality of disk devices comprising disks as storage media, and a disk access control part, which controls access to the above-mentioned plurality of disk devices, and stores a database (DB) in the above-mentioned plurality of disk devices. The computer comprises a DB management information storage area, which stores DB management information for managing the above-mentioned DB, and executes a database management system (DBMS), which operates the above-mentioned DB. The disk rotation control part controls the rotations of the above-mentioned plurality of disk devices. This computer system is configured so as to rotate a disk of a disk device, which is to be accessed, at a second rate of speed, which is zero or greater, and which is slower than a first rate of speed, which is the rotation speed of the disk at access time. This can be carried out by a command from the disk rotation control part, and it can be accomplished via internal control of the storage system. The above-mentioned DB comprises a plurality of DB schema, which is the element that is accessed by the above-mentioned DBMS. The above-mentioned DB management information comprises information which designates which DB schema is stored in each particular location. The above-mentioned DBMS is configured so as to receive a query, prepare a query plan for the received query, and, in accordance with the query plan, issue an access request to a DB schema, which is specified from the above-mentioned DB management information. When the above-mentioned DBMS receives a query, the above-mentioned disk rotation control part specifies, from the query plan of the query and the above-mentioned DB management information, the storage location of the DB schema to be accessed at the time the query is processed, and rotates the disk of the disk device having the specified storage location at the above-mentioned first rate of speed.

In a first aspect of the embodiment, when the above-mentioned DBMS receives a query, the above-mentioned disk rotation control part can specify, from the query plan of the query and the above-mentioned DB management information, all of the storage locations corresponding to all of the respective DB schema to be accessed at the time the query is processed, and can rotate the disks of all of the disk devices comprising all of these respectively specified storage locations at the above-mentioned first rate of speed.

In a second aspect of the embodiment, when the above-mentioned DBMS ends query processing, the above-mentioned disk rotation control part can rotate the disks of all the disk devices that were accessed for the query processing at the above-mentioned second rate of speed.

In a third aspect of the embodiment, the above-mentioned disk rotation control part can, based on an access request issued from the above-mentioned DBMS, recognize the state of progress of the query processing, specify, from the recognized processing progress, the storage location of a DB schema to be accessed in the next step, and rotate the disk of the disk device having the storage location at the above-mentioned first rate of speed.

In a fourth aspect of the embodiment, the access size of each DB schema can be included in the above-mentioned DB management information of the above-mentioned third aspect of the embodiment. The above-mentioned disk rotation control part, using an access request from the above-mentioned DBMS, can specify from the above-mentioned DB management information an access size corresponding to the DB schema to be accessed in accordance with the access request, and, based on the specified access size and the above-mentioned recognized state of processing progress, can control the start timing for rotating the disk of the disk device, in which the DB schema to be accessed in the next step is stored, at the above-mentioned first rate of speed.

In a fifth aspect of the embodiment, the above-mentioned disk rotation control part of the above-mentioned fourth aspect of the embodiment can acquire the amount of data to be transmitted per unit of time, and the length of disk rotation startup time required for the rotation speed of a disk to reach the above-mentioned first rate of speed for the disk device in which the DB schema to be accessed in the above-mentioned next step is stored. Further, the above-mentioned disk rotation control part can specify the progress of the current step based on the above-mentioned access request and the access size corresponding to the DB schema being accessed in the current step, and, on the basis of the specified progress and the above-mentioned acquired amount of data to be transmitted per unit of time, can predict the remaining amount of time required for the processing of the current step. In addition, when the predicted remaining amount of time is less than the above-mentioned acquired disk rotation startup time, the above-mentioned disk rotation control part can rotate the disk of the disk device storing the DB schema to be accessed in the above-mentioned next step at the above-mentioned first rate of speed.

In a sixth aspect of the embodiment, the above-mentioned second rate of speed of the above-mentioned third aspect of the embodiment can be set to 0. The above-mentioned disk rotation control part can specify the storage location of the DB schema to be accessed in the step after next from the above-mentioned recognized state of processing progress, and can rotate the disk of the disk device comprising the storage location at a third rate of speed, which is faster than the above-mentioned second rate of speed but slower than the above-mentioned first rate of speed.

In a seventh aspect of the embodiment, the above-mentioned DB management information of the above-mentioned sixth aspect of the embodiment can comprise the access size of each DB schema. The above-mentioned disk rotation control part can be configured such that, when the access size of the DB schema to be accessed in the above-mentioned next step is specified from the above-mentioned DB management information, and the specified access size is greater than a prescribed value, it does not rotate the disk of the disk device storing the DB schema to be accessed in the above-mentioned step after next.

In an eighth aspect of the embodiment, the above-mentioned storage system can comprise a storage area for storing a count value corresponding to each of the above-mentioned plurality of disk devices. When the above-mentioned disk rotation control part rotates the disk of a disk device at the above-mentioned first rate of speed, it can issue a first rotation control command. When the above-mentioned disk access control part receives the above-mentioned first rotation control command from the above-mentioned disk rotation control part, it rotates the disk of the disk device in accordance with the first rotation control command, and it can increase the count value corresponding to the first rotation control command, and at a prescribed timing, can decrease the count value, and when the updated count value constitutes a prescribed value, it can rotate the disk of the disk device corresponding to the updated count value at the above-mentioned second rate of speed.

In a ninth aspect of the embodiment, when the above-mentioned disk rotation control part of the above-mentioned eighth aspect of the embodiment rotates a disk of a disk device at the above-mentioned second rate of speed, it can issue a second rotation control command. The above-mentioned prescribed timing can be treated as the time when the above-mentioned disk access control part receives the above-mentioned second rotation control command from the above-mentioned disk rotation control part.

In a tenth aspect of the embodiment, the above-mentioned disk rotation control part can rotate a disk of a disk device at the above-mentioned first rate of speed in scanning units rather than the step units that constitute a query plan.

In an eleventh aspect of the embodiment, the above-mentioned disk rotation control part can rotate a disk of a disk device at the above-mentioned second rate of speed in scanning units rather than the step units that constitute a query plan.

In a twelfth aspect of the embodiment, the above-mentioned disk rotation control part can comprise a DB information acquisition part, and a disk rotation instruction part. The above-mentioned DB information acquisition part can acquire information related to the query plan of a query received by the above-mentioned DBMS and the above-mentioned DB management information, and, based on the information, can specify a sequence of scans for the query, and a DB schema and the storage location thereof to be accessed on each scan, and can send DB processing management information, which is information denoting the specified contents, to the disk rotation instruction part. The above-mentioned disk rotation instruction part can receive DB processing management information from the above-mentioned DB information acquisition part, and using the DB processing management information, can specify the storage location of the DB schema to be accessed by a scan when the above-mentioned received query is processed, and can rotate the disk of the disk device comprising the specified storage location at the above-mentioned first rate of speed.

In a thirteenth aspect of the embodiment, DB schema location information, which denotes the ID of each DB schema and the storage location of each DB schema, and DB processing information, which demotes the sequence in which scanning is to be performed, and which DB schema it to be accessed at which scanning step, is included in the above-mentioned DB processing management information of the above-mentioned twelfth aspect of the embodiment. When the above-mentioned DBMS is booted up, or when there is a change to the above-mentioned DB, the above-mentioned DB information acquisition part can prepare the above-mentioned DB schema location information to be sent to the above-mentioned disk rotation instruction part, and when the above-mentioned DBMS receives a query, it can prepare the above-mentioned DB processing information to be sent to the above-mentioned disk rotation instruction part.

In a fourteenth aspect of the embodiment, two or more logical units can be constructed in the above-mentioned plurality of disk devices. The above-mentioned storage system can comprise a storage area for storing storage region management information denoting the correspondence between a logical unit ID and a disk device ID. The above-mentioned DB management information comprises DBMS management information, which denotes the ID of each DB schema and the storage location of each DB schema, and which is managed by the above-mentioned DBMS, and OS management information, which denotes the correspondence between the above-mentioned storage location and a logical unit ID, and which is managed by the operating system (OS) of the above-mentioned computer. When the above-mentioned DBMS receives a query, the above-mentioned disk rotation control part can acquire from the above-mentioned DBMS the storage location of the DB schema to be accessed when the query is processed, can acquire from the above-mentioned OS a logical unit ID corresponding to the specified storage location, and can issue a first rotation control command comprising the above-mentioned acquired logical unit ID. The above-mentioned disk access control part can receive the above-mentioned issued first rotation control command, can specify from the above-mentioned storage region management information a disk drive ID corresponding to the logical unit ID within the received first rotation control command, and can rotate the disk of the disk device that corresponds to the specified disk device ID at the above-mentioned first rate of speed.

In a fifteenth aspect of the embodiment, the above-mentioned disk rotation control part can, based on an access request issued from the above-mentioned DBMS, recognize the state of progress of the query processing, and when the end of processing of the current step is specified from the recognized state of processing progress, can rotate the disk of the disk device accessed in the processing of the current step at the above-mentioned second rate of speed.

In a sixteenth aspect of the embodiment, when the above-mentioned current step processing ends, and the next step processing becomes the current step processing, the above-mentioned disk rotation control part of the above-mentioned fifteenth aspect of the embodiment can be configured so as not to set the rotation speed of the disk of the disk device accessed in the processing of the current step to the above-mentioned second rate of speed when the ended current step processing becomes the next step processing.

The respective parts described hereinabove can also be referred to as means. The respective parts can also be realized by virtue of hardware (for example, circuits), computer programs, or a combination of the two (for example, either one or a plurality of CPUs, which read in and execute computer programs). The respective computer programs can be read in from a storage resource (for example, a memory) provided in a computer machine. The respective computer programs can be installed in this storage resource via a recording medium, such as a CD-ROM, DVD (Digital. Versatile Disk), or the like, or they can be downloaded via a communication network like the Internet or a LAN.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2A is a diagram showing an example of the configuration of storage region management information 156;

FIG. 2B is a diagram showing an example of the configuration of disk rotation management information;

FIG. 3 is a diagram showing an example of the configuration of raw device information 116;

FIG. 5A is a diagram showing an example of the configuration of DB processing management information 126;

FIG. 5B is a diagram showing an example of the configuration of DB schema location information 500;

FIG. 5C is a diagram showing an example of the configuration of DB processing information 520;

FIG. 5D is a diagram showing an example of the configuration of disk information 128;

FIG. 8 is a flowchart showing an example of the procedures of a DB information acquisition and transmission process;

DETAILED DESCRIPTION

The aspects of the embodiment of the present invention will be explained below. First, an overview of the aspects of the embodiment will be explained.

A DB system related to this embodiment is a variety of a computer system, and includes a computer for operating a DBMS (hereinafter, DB server), and a storage system for storing DB data. Further, the storage system includes a disk rotation instruction program for providing instructions related to the rotation of a disk. The storage system performs disk rotation control in accordance with an instruction from the disk rotation instruction program.

As one characteristic feature of this embodiment, attention will focus on the fact that a process in accordance with a query received by the DBMS (hereinafter, DB process) is carried out in line with a plan of this query (hereinafter, query plan). In a DB process, a table or index, called a DB schema, is accessed in the order stipulated by the query plan, and in this embodiment, information denoting the correspondence between the respective DB schemas and DB schema storage locations (hereinafter, DB schema location information) is constructed.

The disk rotation instruction program specifies the DB schema, which will ultimately be accessed, and the storage location thereof based on information related to the query plan of a query received by the DBMS and the DB schema location information, and issues to the storage system a rotation start command for the disk of the disk device corresponding to the specified storage location. Further, at the point in time at which the DB process of one query has ended, the disk rotation instruction program issues to the storage system a rotation stop command for the disk that was rotated in this DB process.

This embodiment will be explained in detail hereinbelow. Furthermore, the present invention is not limited to this embodiment.

Figure 1:
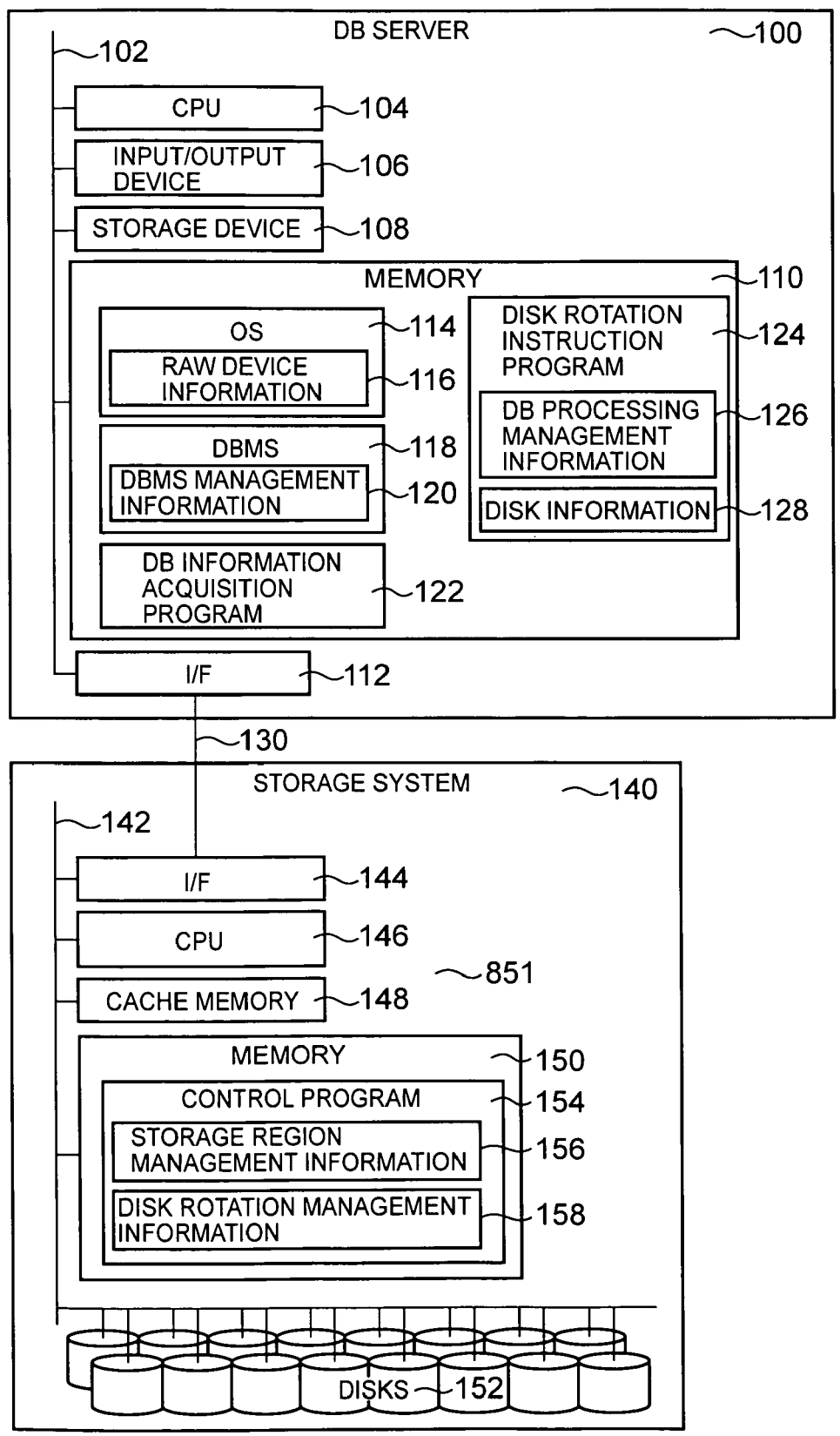
FIG. 1 is a diagram showing an example of the configuration of a DB system related to one embodiment of the present invention.

FIG. 1 is a diagram showing an example of the configuration of a DB system related to one embodiment of the present invention.

In this DB system (computer system), a DB server 100 and a storage system 140 are connected via a communication network 130. The DB server 100 executes a DBMS 118, which manages a DB stored in the storage system 140. The storage system 140 stores the DB and other such data used by the DB server 100. The communication network 130 can be a local area network (LAN), wide area network (WAN) or other such network, or it can be a network configured from fibre channel or the like (a storage area network: SAN). Furthermore, in FIG. 1, only one DB server 100 and one storage system 140 are disclosed, but there can also be a plurality of DB servers 100 and storage systems 140.

The DB server 100, for example, can be an ordinary computer. More specifically, for example, the DB server 100 has a CPU (control processor) 104, which is connected via an internal bus 102; an input/output device 106; a storage device 108; a memory 110; and an I/F 112 (an interface with the communication network 103). In at least one of the memory 110 and storage device 108, there is stored an operating system (hereinafter, "OS") 114, DBMS 118, DB information acquisition program 122, and disk rotation instruction program 124.

The OS 114, DBMS 118, DB information acquisition program 122, and disk rotation instruction program 124 are executed by the CPU 104. The OS 114 maintains raw device information 116, which corresponds a raw device with a logical storage region on the storage system 140. Furthermore, a raw device is a logical storage device unit managed by the OS. The DBMS 118 maintains DBMS management information 120 required for operating and managing a DB. The DBMS 118 receives a query from an application not shown in the figure, prepares a query plan for the received query, and, in accordance with this query plan, issues an access request (also called an I/O request) to an access destination specified from the DBMS management information 120. The DB information acquisition program 122 executes processing for acquiring various information related to the DB. The disk rotation instruction program 124 maintains DB processing management information 126 required for a disk rotation instruction, and disk information 128 related to a disk of the storage system 140.

The storage system 140 includes a plurality of disk devices 152, and a controller 851 connected to these disk devices 152. The controller 851, for example, has an I/F 144 (interface with the communication network 130), which is connected to an internal bus 142; a CPU (control processor) 146, a cache memory 148; and a memory 150. A control program 154 for controlling the storage system 140 is stored in the memory 150, and is executed by the CPU 146. Further, the control program 154 maintains storage region management information 156 for corresponding a logical storage region of the storage system 140 with a physical storage region of a disk device 152, and disk rotation management information 158 for managing the rotational state of a disk device 152. Furthermore, a disk device 152, for example, can be a hard disk drive, and the storage system 140 can incorporate a plurality of disk drives arranged into a RAID (Redundant Array of Independent (or Inexpensive) Disks). Furthermore, the various programs mentioned hereinabove can be installed in the respective devices via a portable storage medium or a communication network.

When the storage system 140 receives a write request and data from the DB server 100, the control program 154 temporarily stores the received data in the cache memory 148, and thereafter, reads out this data from the cache memory 148, and writes this data to the disk device 152, which constitutes the access destination stipulated in the write request. When the storage system 140 receives a read request from the DB server 100, the control program 154 reads out data from the disk device 152, which constitutes the access destination stipulated in the read request, temporarily stores it in the cache memory 148, and thereafter, reads out the data from the cache memory 148, and sends it to the DB server 100.

The configuration of a DB system related to this embodiment has been explained hereinabove.

Furthermore, in this embodiment, the disk rotation instruction program 124 runs on the DB server 100, but the disk rotation instruction program 124 can also either be run on a different computer connected to the DB server and storage system, or on the storage system. Further, the memory 150 and the cache memory 148 can be integrated together.

Further, the DB server 100 and storage system 140 can also be mounted in a single chassis. More specifically, for example, the DB server 100 can also be mounted as a so-called blade server in a chassis, in which are mounted the controller 851 of the storage system 140 and a disk device 152.

Further, the above-described configuration of the controller 851 is an example, and other configurations can also be employed. For example, instead of the above-mentioned configuration, the controller 851 can comprise one or more first control parts (for example, control circuit boards), which control communications with an external device (for example, the DB server 100); one or more second control parts (for example, control circuit boards), which control communications with a disk device 152; a cache memory capable of storing data exchanged between the external device and the disk device 152; a control memory capable of storing data for controlling the storage system 140; and a connection part (for example, a switch, such as a crossbar switch), which connects the respective first control parts, respective second control parts, the cache memory and the control memory. In this case, either a first control part or a second control part, or both a first control part and a second control part in cooperation can perform processing as a controller 851. The control memory can be done away with, and when this is the case, a region for storing the information stored in the control memory can be provided in the cache memory.

The various information mentioned above will now be explained in detail hereinbelow.

FIG. 2A is a diagram showing an example of the configuration of storage region management information 156, which is maintained by the control program 154 of the storage system 140.

The storage region information 156 is information, which corresponds a logical storage region (hereinafter "logical unit") of the storage system 140 to the physical storage region in which data is actually stored, and has an entry for each logical unit. The respective entries have a field 200 for registering a logical unit number for identifying a logical unit; a field 202 for registering the number of a logical block inside a logical unit (hereinafter, "logical block address"); a field 204 for registering the number of a disk device (physical disk number) of a physical block corresponding to a logical block; and a field 206 for registering the number of a physical block (hereinafter, "physical block address") corresponding to a logical block.

Furthermore, block is the term used to indicate a unit of data when using a storage region, and generally consists of 512 bytes. Further, a logical block must correspond on a one-to-one basis to a physical block, but not all logical blocks need to be on the same disk. The storage system 140 receives an access from the DB server 100 via a logical unit and a logical block address. Then, the storage system 140 allocates a physical disk number of a physical block and a physical block address, which correspond to the logical unit and logical block, from the storage region information 156, and carries out the actual access.

FIG. 2B is a diagram showing an example of the configuration of disk rotation management information 158, which is maintained by the control program 154 of the storage system 140.

Disk rotation management information 158 is information for individually (in physical disk units) managing the rotational state of a disk device 152 of the storage system 140, and has an entry corresponding to each disk device 152. The respective entries have a field 220 for registering a physical disk number for identifying individual disk devices; and a field 222 for registering a count value (hereinafter, rotational state count value) for indicating the rotational state of a disk device.

FIG. 3 is a diagram showing an example of the configuration of raw device information 116 maintained by the OS 114 of the DB server 100.

Raw device information 116 is information, which corresponds a raw device of the OS 114 to a storage region on the storage system 140 allocated to this raw device. Raw device information 116 has an entry corresponding to each raw device. The respective entries have a field 300 for registering the filename of a raw device; a field 302 for registering the address of the storage system in which the storage region allocated to a raw device exists; a field 304 for registering a logical unit number of the logical unit in which the allocated storage region exists; a field 306 for registering the lead logical block address in the logical unit of the allocated storage region; and a field 308 for registering the number of logical blocks of the allocated storage region.

Figure 4A:
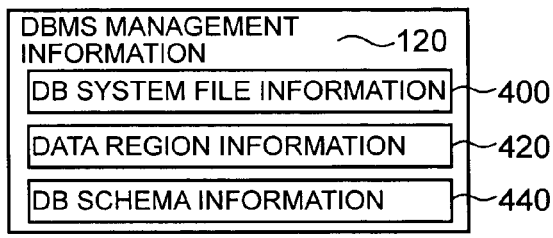
FIG. 4A is a diagram showing an example of the configuration of DBMS management information 120.

FIG. 4A is a diagram showing an example of the configuration of DBMS management information 120 maintained by the DBMS 118. Furthermore, DBMS management information 120 is set by an administrator or the like when a DB is initially established, and when it is operated.

DBMS management information 120 has DB system file information 400, which is setup information of a DB system file; data region information 420, which is setup information of a data region; and DB schema information 440, which is setup information of a DB schema, such as a table or index.

Figure 4B:
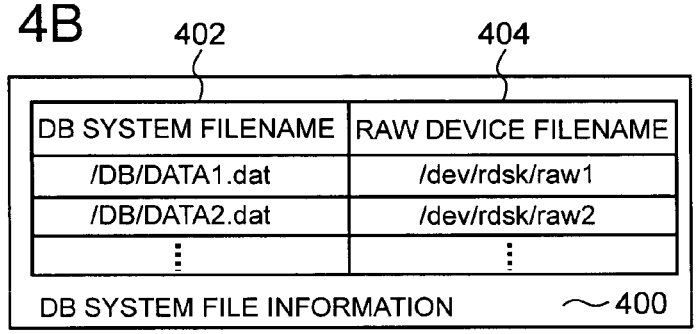
FIG. 4B is a diagram showing an example of the configuration of DB system file information 400.

FIG. 4B is a diagram showing an example of the configuration of DB system file information 400.

DB system file information 400 is information for corresponding a DB system file to the above-mentioned raw device. DB system file information 400 has an entry for each DB system file. The respective entries have a field 402 for registering the filename of a DB system file; and a field 404 for registering the filename of a raw device to which a DB system file is registered. Furthermore, a DB system file is one large file created on a raw device. The DBMS 118 constructs a DB by writing the data of the DB into this DB system file. Further, with regard to the DB data written into a DB system file, the OS 114 allocates from the above-mentioned raw device information 116 a logical storage region of the storage system 140 into which the data will actually be written. Then, the OS 114 issues to the storage system 140 a data write command for the allocated storage region.

Figure 4C:
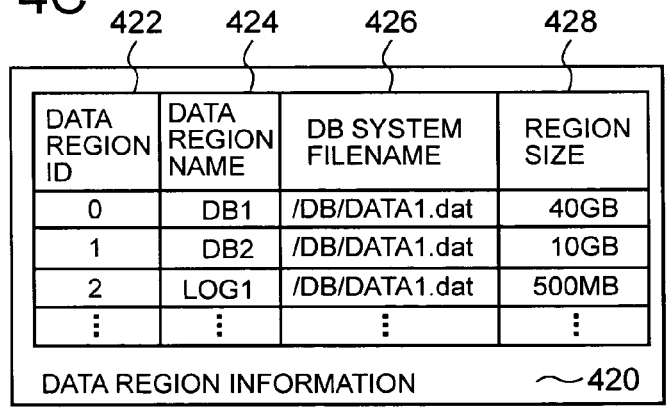
FIG. 4C is a diagram showing an example of the configuration of data region information 420.

FIG. 4C is a diagram showing an example of the configuration of data region information 420.

Data region information 420 is setup information of a data region managed by the DBMS 118. Data region information 420 has an entry for each data region. The respective entries have a field 422 for registering a data region ID for identifying a data region; a field 424 for registering the name of a data region; a field 426 for registering the filename of a DB system file created in the data region; and a field 428 for registering the size of the region allocated to a data region. Furthermore, a data region is a data region for storing DB data, and is created on a DB system file.

Figure 4D:
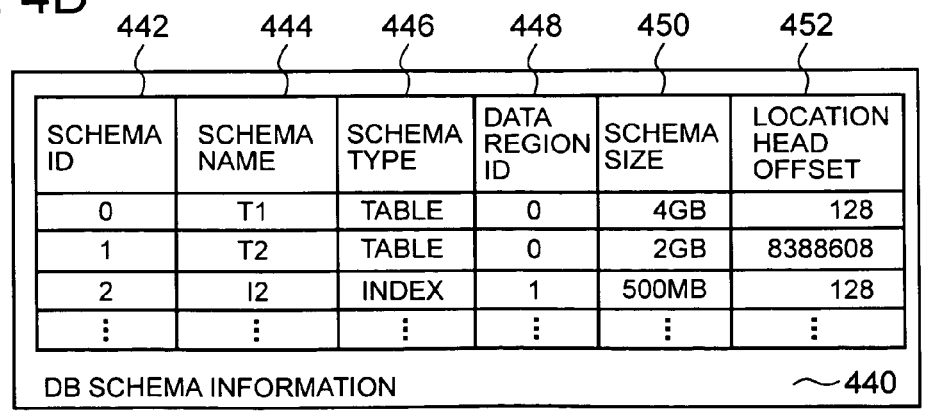
FIG. 4D is a diagram showing an example of the configuration of DB schema information 440.

FIG. 4D is a diagram showing an example of the configuration of DB schema information 440.

DB schema information 440 is setup information related to a DB schema, such as a table or index managed by the DBMS 118. DB schema information 440 has an entry for each DB schema. The respective entries have a field 442 for registering a DB schema ID for identifying a DB schema; a field 444 for registering the name of a DB schema; a field 446 for registering the type of a DB schema; a field 448 for registering the ID of a data region into which a DB schema is written; a field 450 for registering the size of a DB schema; and a field 452 for registering the offset of a data region into which a DB schema is written.

FIG. 5A is a diagram showing an example of the configuration of DB processing management information 126 maintained by the disk rotation instruction program 124. Furthermore, DB processing management information 126 is automatically prepared in accordance with the DB information acquisition program 122 acquiring required information from the DBMS 118 and OS 114, and sending it to the disk rotation instruction program 124.

DB processing management information 126 has DB schema location information 500, which is logical location information of the respective DB schemas, and DB processing information 520, which is information related to DB processing.

FIG. 5B is a diagram showing an example of the configuration of DB schema location information 500.

DB schema location information 500 is information indicating the above-mentioned DB schema and its storage location. DB schema location information 500 has an entry for each DB schema. The respective entries have a field 502 for registering a schema ID for identifying a DB schema; a field 504 for registering a DBMS ID for identifying the DBMS of a DB schema; a field 506 for registering the type of a DB schema; a field 508 for registering the address of the storage system in which a DB schema is written; and a field 510 for registering the logical unit number of the storage system 140 in which a DB schema is written. Furthermore, a DBMS ID is a value allocated in advance by an administrator or the like as a unique value to each DBMS.

FIG. 5C is a diagram showing an example of the configuration of DB processing information 520.

DB processing information 520 is information related to a DBMS-executed query, and a search executed during this query (hereinafter, also referred to as a "scan", such as a table scan, or index scan). DB processing information 520 has an entry for each step of a query. The respective entries have a field 522 for registering a DBMS ID for identifying a DBMS for executing a query; a field 524 for registering a query ID for identifying a query to be executed; a field 526 for registering a scan ID for identifying a scan to be executed during a query; a field 528 for registering the ID of a DB schema to be accessed via this scan; a field 530 for registering the size of the DB schema to be accessed; and a field 532 for registering the type of a scan. Furthermore, a scan ID is allocated by treating a scan executed during this query as a unique value, and scanning is executed in order from the smallest of these values.

FIG. 5D is a diagram showing an example of the configuration of disk information 128 maintained by the disk rotation instruction program 124. Furthermore, an administrator or the like sets disk information 128 when the disk rotation instruction program 124 is booted up.

Disk information 128 is information related to the rotation startup time of a disk device 152 of the storage system 140, which stores DB data, and the average per-second data transmission rate. The plurality of disks mounted in a single storage system is practically all the same disks. Accordingly, disk information 128 has an entry for each storage system 140 connected to the DB server 100. The respective entries have a field 540 for registering the address of a storage system 140; a field 542 for registering the disk rotation startup time of a disk device 152 mounted to the storage system 140; and a field 544 for registering the average per-second data transmission rate of the storage system 140. Furthermore, the disk rotation startup time is the time period from the state wherein disk rotation is stopped until rotation commences and reaches stability (in other words, the time until the rotation rate reaches actual access speed). Furthermore, when disk devices of different types (for example, I/F types) coexist in a single storage system (for example, when a disk device having an SCSI I/F and a disk device having an ATA I/F co-exist), and entry can be provided for each disk device.

Figure 6A:
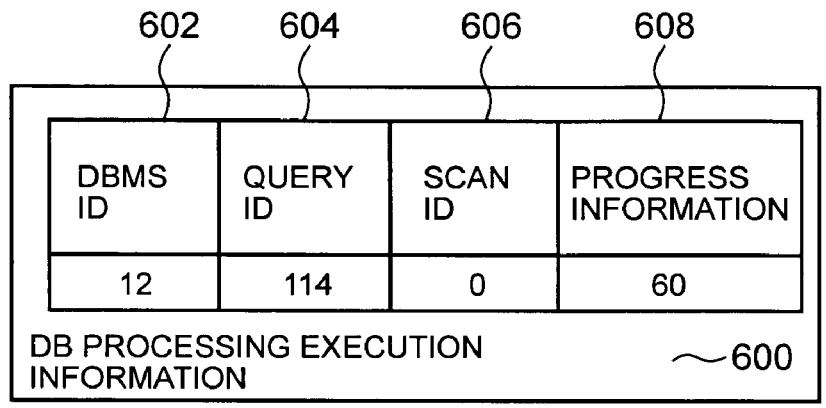
FIG. 6A is a diagram showing an example of the configuration of DB processing execution information 600.

FIG. 6A is a diagram showing an example of the configuration of DB processing execution information 600.

DB processing execution information 600 is information, which the DB information acquisition program 122 sends to the disk rotation instruction program 124 when a DBMS 118 issues a request to access DB data while DB processing is being executed in conformance to a query. DB processing execution information 600 has a field 602 for registering the ID of the DBMS, which is executing a query involving the access request; a field 604 for registering a query ID of the query involving the access request; a field 606 for registering the scan ID of a scan involving the access request; and a field 608 for registering progress information, which shows the progress of the scan in question at the point in time of this access. Furthermore, a variety of methods can be used to indicate progress. More specifically, for example, progress information can be a percentage of the total schema size of the amount of data read out by this scan (the sum of the sizes of the DB schemas belonging to this scan ID), and can also be a value denoting how many of the lines to be accessed by this scan have been searched.

Figure 6B:
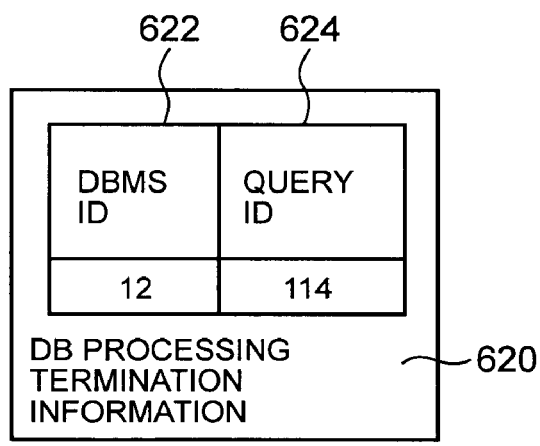
FIG. 6B is a diagram showing an example of the configuration of DB processing termination information.

FIG. 6B is a diagram showing an example of the configuration of DB processing termination information 620.

DB processing termination information 620 is information, which the DB information acquisition program 122 sends to the disk rotation instruction program 124 when a DBMS 118 ends a query. DB processing termination information 620 has a field 622 for registering the DBMS ID of a DBMS, which executed the query to be ended; and a field 624 for registering a query ID for the query to be ended.

Figure 7A:
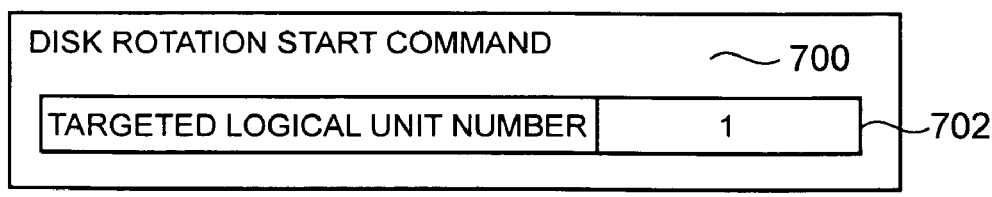
FIG. 7A is a diagram showing an example of the configuration of a disk rotation start command 700.

FIG. 7A is a diagram showing an example of the configuration of a disk rotation start command 700, which the disk rotation instruction program 124 executes for the storage system 140.

The disk rotation start command 700 has a list 702 of logical unit numbers for the disks for which rotation is to be commenced.

Figure 7B:
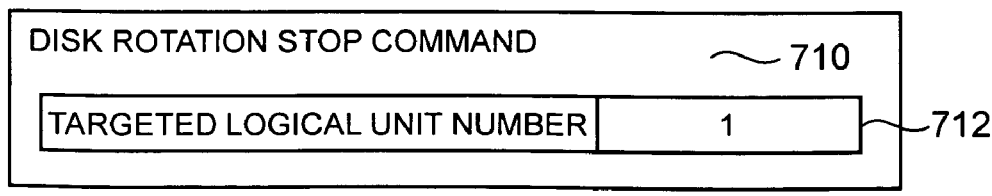
FIG. 7B is a diagram showing an example of the configuration of disk rotation stop command 710.

FIG. 7B is a diagram showing an example of the configuration of a disk rotation stop command 710, which the disk rotation instruction program 124 executes for the storage system 140.

The disk rotation stop command 710 has a list 712 of logical unit numbers for the disks for which rotation is to be stopped.

The procedures of a process for acquiring and transmitting various types of information executed by the DB information acquisition program 122 (hereinafter, "DB information acquisition and transmission process"), a process related to disk rotation instructions executed by the disk rotation instruction program 124 (hereinafter, "disk rotation instruction process"), and a process related to disk rotation control executed by the control program of the storage system 140 (hereinafter, "disk rotation control process") will be explained hereinbelow. Furthermore, it is supposed that the DB has been constructed (the DBMS management information 120 is finished being prepared).

FIG. 8 is a flowchart showing an example of the procedures of a DB information acquisition and transmission process.

Hereinafter, when program is the subject, it is supposed that processing is actually carried out by the CPU, which executes this program.

A system administrator boots up the DB information acquisition program 122 on the DB server 100, and commences the DB information acquisition and transmission process (Step 800).

The DB information acquisition program 122 enters the sleep state (standby state) immediately after being booted up, and continues to wait for an interrupt, which will be explained below (Step 802).

When a DBMS 118 is started up (YES in Step 804), or when there is a change to the DB (No in Step 804, YES in Step 806), the DB information acquisition program 122 acquires information related to a DB schema from the DBMS management information 120 maintained by the DBMS 118, and from the raw device information 116 maintained by the OS 114 (Step 808). More specifically, for example, a schema ID, schema type and data region ID are acquired from the DB schema information 440, a DB system filename corresponding to this data region ID is acquired from the data region information 420, a raw device filename corresponding to this DB system filename is acquired from the DB system file information 400, and a storage system address and logical unit number corresponding to this raw device filename are acquired from the raw device information 116.

The DB information acquisition program 122 prepares DB schema location information 500, comprising the acquired information, and the ID of the DBMS 118, which maintains the DBMS management information 120, and sends the prepared DB schema location information 500 to the disk rotation instruction program (Step 810). Furthermore, when a DBMS 118 is operating at the point in time when the DB information acquisition program 122 is booted up, the DB information acquisition program 122 executes the processing of Step 808 and Step 810 immediately subsequent to being booted up.

Figure 11:
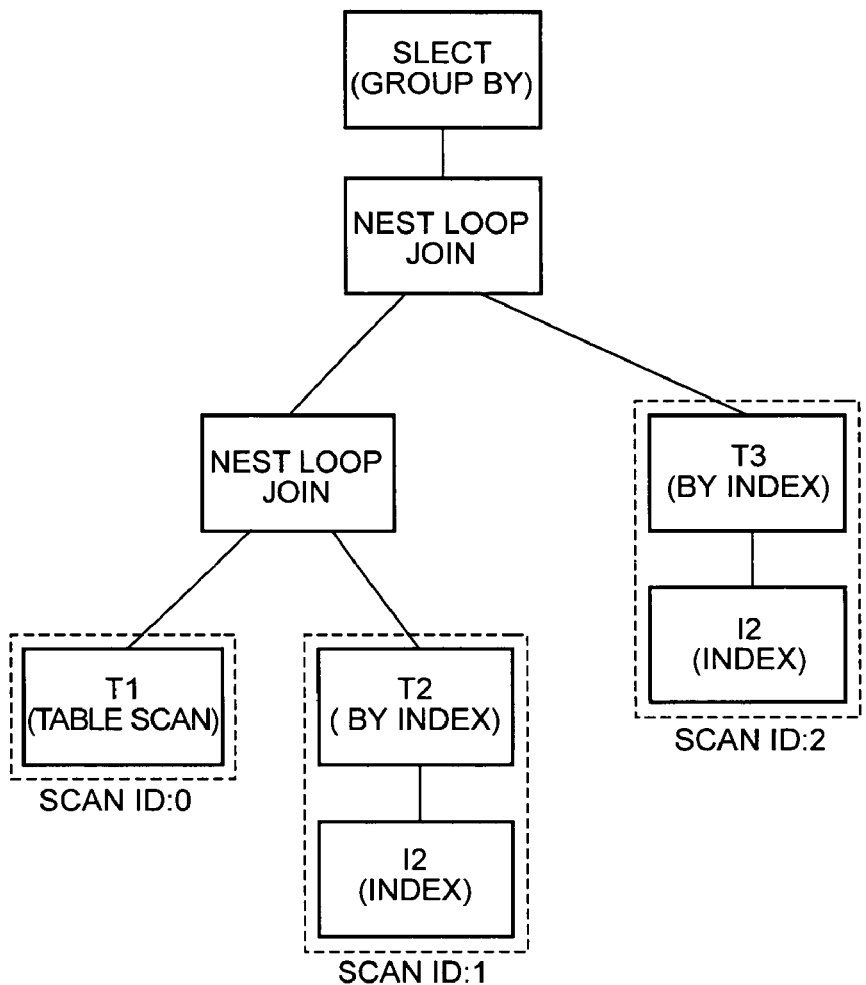
FIG. 11 is a diagram showing an example of the configuration of a query plan.

When a DBMS 118 receives a query (Yes in Step 812), the DBMS 118 prepares a query plan of this query. The DB information acquisition program 122 acquires information related to this query plan from the DBMS 118 (Step 814), uses this information to prepare DB processing information 520, and sends the prepared DB processing information 520 to the disk rotation instruction program (Step 816). This will be explained hereinbelow giving the case of the query plan illustrated in FIG. 11 as an example. The query plan illustrated in FIG. 11 is composed from a plurality of steps arranged into a tree structure. According to this query plan, three scanning processes are carried out, more specifically, a process for scanning a table of schema names "T1", a process for scanning a table of schema names "T2" using an index of schema names "I2", and a process for scanning a table of schema names "T3" using an index of schema names "I2". The DB information acquisition program 122 assigns a specific ID to each scanning process. Further, the DB information acquisition program 122 acquires a schema ID and schema size corresponding to the respective schema names from the DB schema information 440. The DB information acquisition program 122 also acquires a DBMS ID corresponding to the acquired schema ID from the DB schema location information 500. Then, the DB information acquisition program 122 prepares DB processing information 520, comprising the acquired DBMS ID, the ID of the query received by the DBMS 118, the above-mentioned assigned scan ID, the above-mentioned acquired schema ID and schema size, and the scan type of the respective scanning processes, and sends the prepared DB processing information 520 to the disk rotation instruction program 124. When the DB processing information 520 is inputted to the disk rotation instruction program 124, the disk rotation instruction program 124 specifies the logical unit in which the DB schema accessed on the initial scan is stored, and a disk rotation start command 700 comprising the number of this logical unit is issued to the storage system 140. Accordingly, the disk rotation instruction program 124 can be counted on to rotate a disk of a disk device 152 before an access request for an initial scan reaches the storage system 140 from the DB server 100, and an access is generated to this disk device 152.

When a DBMS 118 accesses the data of a DB during query execution (that is, during DB processing), an access request is issued from the DBMS 118. This access request, for example, includes information such as a schema ID, and where to access the DB schema corresponding to this schema ID (for example, the page number and line number). In the DB server 100, the OS 114 receives an access request from a DBMS 118, acquires needed information from the raw device information 116 by using the information element comprising this access request as a search key, and issues an access request comprising the acquired information (for example, an access request comprising a logical unit number) to the storage system 140. There are times when an access request is issued from a DBMS 118 a plurality of times in a single scanning process. By referencing the information elements (for example, a DB schema ID, and where to access the DB schema) comprising an access request issued from a DBMS 118, it is possible to either specify the state of progress of a single scanning process, or to specify that another scanning process be commenced.

When an access request is issued from a DBMS 118 (Yes in Step 818), the DB information acquisition program 122 acquires an information element from within this access request (Step 820), prepares DB processing execution information 600 based on this information element, and sends this DB processing execution information 600 to the disk rotation instruction program 124 (Step 822). A DBMS ID, query ID and scan ID, for example, can be acquired from DB processing information 520 by using the schema ID in an access request as a search key. Progress information, for example, can be specified based on a schema size capable of being acquired by using a schema ID in an access request as a search key, and on a prescribed information element within the access request (for example, where to access the DB schema).

When a DBMS 118 finishes executing a query (Yes in Step 824), the DB information acquisition program 122 acquires information related to the ended query from the DBMS 118 (Step 826), prepares DB processing termination information 640, and sends it to the disk rotation instruction program 124 (Step 828).

The foregoing is an explanation of an example of the procedures of a DB information acquisition and transmission process. Furthermore, when a DBMS 118 receives a plurality of queries, the above-described processing is carried out for each of this plurality of queries.

Further, a variety of methods can be employed so as to enable the DB information acquisition program 122 to detect the fact that Step 804 is Yes, Step 806 is Yes, Step 812 is Yes, Step 818 is Yes, and Step 824 is Yes. More specifically, for example, an interface for notifying information to the DB information acquisition program 122 at the below-mentioned times of (1) through (5) can be provided inside a DBMS 118, enabling the DB information acquisition program 122 to detect this information via this interface.

(1) After a DBMS is started up (In this case, for example, the DBMS 118 sends a startup notification to the DB information acquisition program 122 simultaneous to being started up.);

(2) When a change occurs in a DB (In this case, for example, the DBMS 118 sends a notification of a DB change to the DB information acquisition program 122 simultaneous to the change occurring.);

(3) When a query is received (In this case, for example, the DBMS 118 notifies the DB information acquisition program 122 of information related to the query plan of the received query simultaneous to the query plan being prepared.);

(4) When a DBMS issues an access request (In this case, for example, the DBMS 118 sends information related to an access destination to the DB information acquisition program 122 simultaneous to the access request being issued.); and (5) When a query ends (In this case, for example, the DBMS 118 sends information related to the ended query to the DB information acquisition program 122 simultaneous to the query process being ended.).

Furthermore, when the above-mentioned (1) and (2) are received, as described hereinabove, the DB information acquisition program 122 acquires information related to a DB schema location from the OS 114 and a DBMS 118, prepares DB schema location information 500, and sends it to the disk rotation instruction program 124. Further, when the above-mentioned (3), (4) and (5) are received, the DB information acquisition program 122 prepares and sends information to be sent to the disk rotation instruction program 124 based on the information received from the DBMS 118.

Now then, an example of the procedures of a disk rotation instruction process will be explained next.

Figure 9:
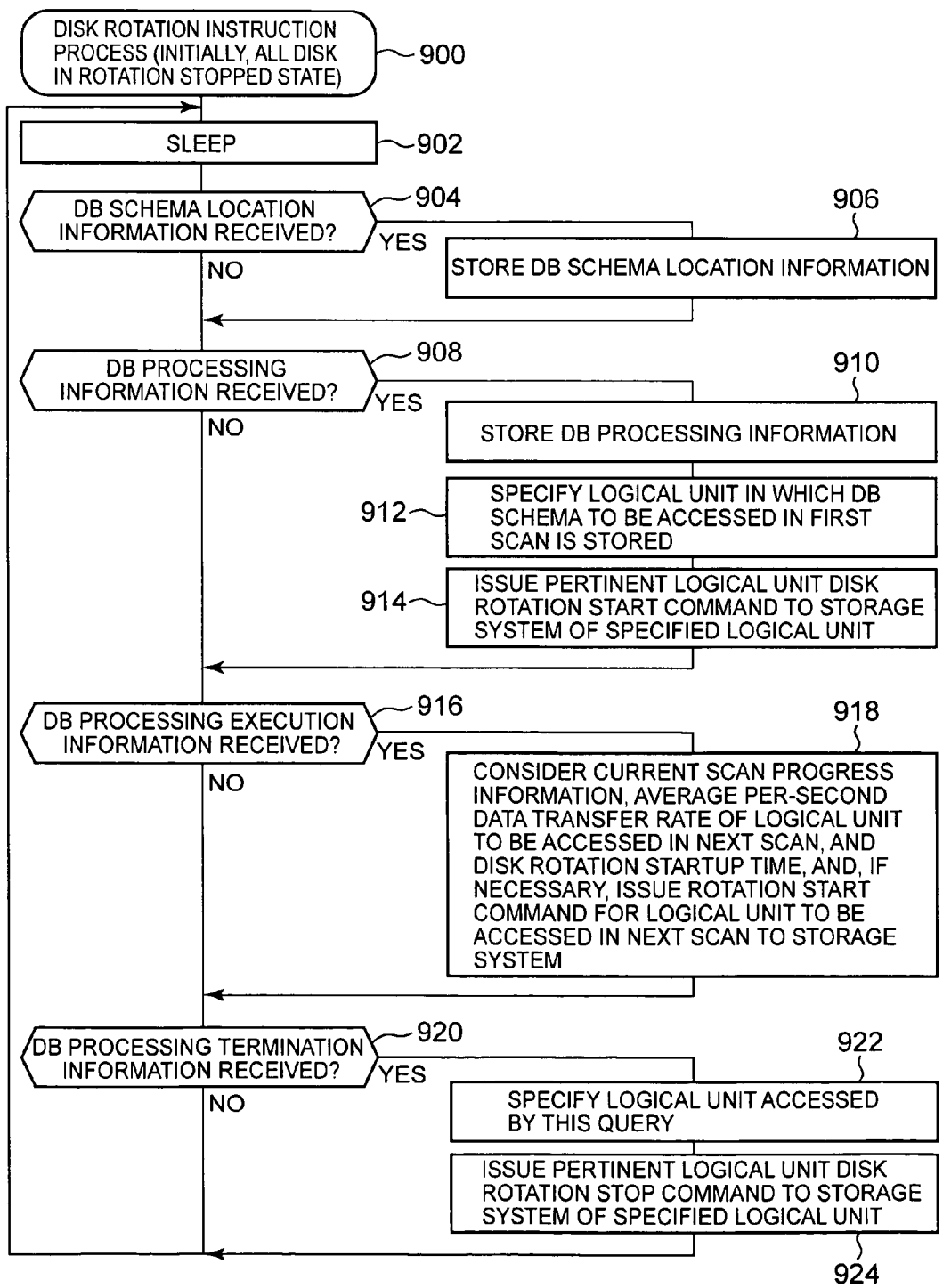
FIG. 9 is a flowchart showing an example of the procedures of a disk rotation instruction process.

FIG. 9 is a flowchart showing an example of the procedures of a disk rotation instruction process.

A system administrator boots up the disk rotation instruction program 124, and commences a disk rotation instruction process (Step 900). Furthermore, the disk rotation instruction program 124 must be booted up before the DB information acquisition program 122 explained above.

The disk rotation instruction program 124 enters the sleep state (standby state) immediately after being booted up, and waits for DB schema location information 500, DB processing information 520, DB processing execution information 600, or DB processing termination information 620 to be sent from the DB information acquisition program 122 (Step 902). Furthermore, as the initial state, the rotation of all the disk devices 152 inside the storage system 140 is in the stopped state (that is, a state in which there is no rotation at all).

When DB schema location information 500 is received (Yes in Step 904), the disk rotation instruction program 124 stores the received DB schema location information 500 in memory 110 as part of the DB processing management information 126 (Step 906).

When DB processing information 520 is received (Step 908), the disk rotation instruction program 124 stores the received DB processing information 520 in memory 110 as part of the DB processing management information 126 (Step 910). The disk rotation instruction program 124 references the DB processing information 520 stored in Step 910, and retrieves the entry of scan ID "0", thereby specifying the access-targeted schema ID of this entry, and identifying, from this access-targeted schema ID, the DB schema to be accessed by the scan corresponding to scan ID "0". Furthermore, the scan of scan ID "0" signifies a scan, which is first executed during the query in which this scan is executed (In other words, the scan is executed in order from the lowest scan ID.). The disk rotation instruction program 124 carries out rotation start instructions for the disk device to be accessed in this initial scan. More specifically, the disk rotation instruction program 124 retrieves DB schema location information 500 using the specified access-targeted schema ID as a key, and specifies the storage system 140 address, where this DB schema is stored, and a logical unit number (Step 912). The disk rotation instruction program 124 issues a disk rotation start command 700 comprising the logical unit number specified in Step 912 to the storage system 140 corresponding to the address specified in Step 912 (Step 914). Furthermore, the disk rotation instruction program 124, upon receiving the DB processing information 520, can specify all of the DB schema to be accessed in the DB processing for a query corresponding to this DB processing information 520, can specify all the logical unit numbers where the specified DB schema are stored, and can issue to the storage system 140 a disk rotation start command 700 comprising the specified logical unit numbers. This makes it possible to rotate in advance the disks of all the disk drives to be accessed in this DB processing. In this case, since the processing of Step 916 and Step 918 becomes unnecessary, and the transmission and reception processing of DB processing execution information 600 also becomes unnecessary, overhead can be reduced by that much, and improved performance can be expected. However, because disk rotation control cannot be implemented for each scan in a query, the power consumed during a single DB process is greater than when disk devices are sequentially rotated in line with the flow of DB processing.

When DB processing execution information 600 is received (Yes in Step 916), the disk rotation instruction program 124 retrieves the entry of the DB processing information 520, which has the same values as the DBMS ID, query ID, and scan ID of the received DB processing execution information 600, and estimates, from the schema size of this entry, the average per-second data transmission rate of the disk information 128, and the progress information of the DB processing execution information 600, the amount of time remaining until the scan corresponding to this scan ID ends. As a result of this, if the estimated remaining amount of time is shorter (or less) than the disk rotation startup time (the time written in the disk information 128) of the storage system constituting the access destination (the storage system corresponding to the schema ID linked to the scan ID used as a search key) 140, the disk rotation instruction program 124 specifies the logical unit number of the DB schema to be accessed in the next scan, and issues a disk rotation start command 700 comprising the specified logical unit number to this storage system 140 (Step 918). This makes it possible to rotate the disk of the disk device 152 to be accessed in the next scan before an access request is issued to this disk device 152 from the DB server 100.

When DB processing termination information 620 is received (Yes in Step 920), the disk rotation instruction program 124 retrieves the entry of the DB processing information 520, which has the values of the DBMS ID and query ID of the received DB processing termination information 620, and specifies the access-targeted schema ID of this entry. The disk rotation instruction program 124 retrieves DB schema location information 500 using the specified schema ID as a key, and specifies the storage system address and logical unit number corresponding to this schema ID (Step 922). The disk rotation instruction program 124 issues a disk rotation stop command comprising the logical unit number specified in Step 922 to the storage system 140 corresponding to the address specified in Step 922 (Step 924). Furthermore, Step 922 and Step 924 are repeated for all entries that meet the conditions in Step 922.

Figure 10:
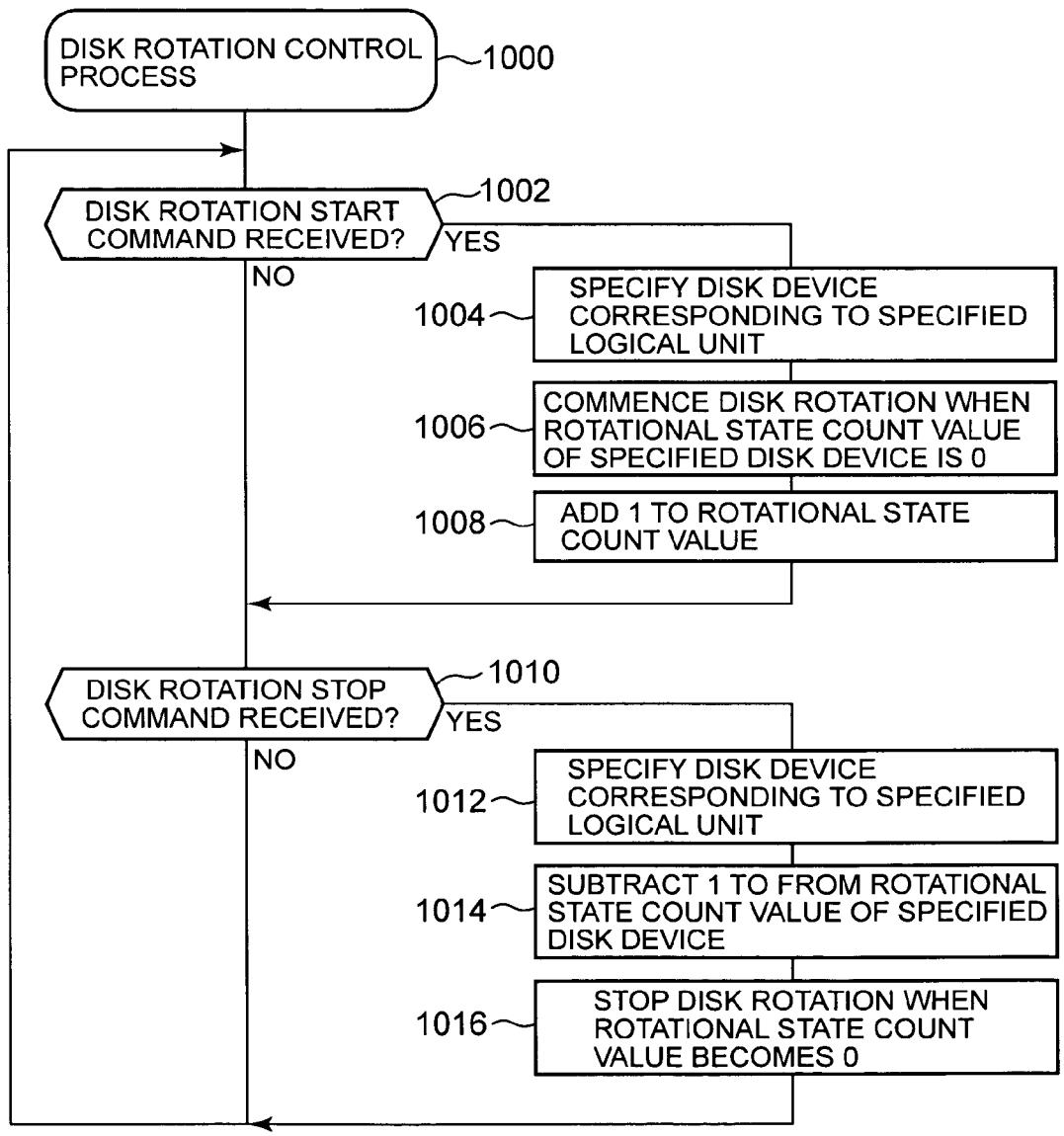
FIG. 10 is a flowchart showing an example of the procedures of a disk rotation control process.

FIG. 10 is a flowchart showing an example of the procedures of a disk rotation control process. Furthermore, a control program 154 is a program for controlling a storage system 140, but only the part related to disk rotation control is shown in this flowchart.

When a disk rotation start command 700 is received from the disk rotation instruction program 124 (Yes in Step 1002), the control program 154 references storage region management information 156, and specifies the physical disk number corresponding to the targeted logical unit number comprised in this command 700 (Step 1004). The control program 154 references the disk rotation management information 158 and retrieves the corresponding entry using the physical disk number specified in Step 1004 as the key. When the rotational state count value of this entry is 0, the control program 154 starts the rotation of the disk of this disk device by issuing a prescribed command to the corresponding disk device (Step 1006). The control program 154 adds 1 to the rotational state count value of the entry retrieved in Step 1006 (Step 1008). Furthermore, when a plurality of disk devices is allocated to a single logical unit, Step 1006 and Step 1008 are executed repeatedly a number of times corresponding to this number of disk devices. Further, when the rotational state count value is not 0 in Step 1006 (that is, when it is 1 or larger), since the pertinent disk device is being rotated, the processing for starting rotation becomes unnecessary, and the rotational state count value can be added.

When a disk rotation stop command 710 is received from the disk rotation instruction program 124 (No in Step 1002, and Yes in Step 1010), the control program 154 references the storage region management information 156, and specifies a physical disk number corresponding to the targeted logical unit number of this command 710 (Step 1012). The control program 154, using the physical disk number specified in Step 1012 as a key, references disk rotation management information 158, retrieves the corresponding entry, and subtracts 1 from the rotational state count value of this entry (Step 1014). When the rotational state count value becomes 0 in accordance with the subtraction of Step 1006, the control program 154 stops the rotation of the disk of this disk device by issuing a prescribed command to the corresponding disk drive (Step 1016). Furthermore, when a plurality of disk devices is allocated to a single logical unit, Step 1014 and Step 1016 are executed repeatedly a number of times corresponding to this number of disk devices.

The foregoing are explanations of examples of the procedures of a disk rotation start process and a disk rotation control process. Furthermore, when a DBMS 118 receives a plurality of queries, the reception of DB processing information is carried out a plurality of times. More specifically, for example, when a DBMS 118 receives a new query while executing another query, the reception of DB processing information is carried out anew. In this case, even though a disk rotation start command 700 for a certain logical unit is only generated one time in the DB processing of a single query, there are circumstances in which this command 700 will be issued one or more times during the DB processing of another query. In other words, there are circumstance wherein the rotational state count value of a certain disk device 152 for constructing a certain logical unit (Refer to FIG. 2B) will not become "0" even when a disk rotation stop command 710 is issued as a result of one query ending, because a count value was added in accordance with a disk rotation start command being issued on the basis of DB processing information of a different query. In this case, even though the processing of one query ends, since the processing of a subsequent query soon generates an access to this disk device 152, the rotation of the disk of this certain disk drive 152 is continued. Thus, a plurality of queries can also be supported. Furthermore, the disk rotation instruction program 124 maintains DB processing management information 126 for each and every query, and when the processing of one query ends (for example, when DB processing termination information 620 is received), the DB processing management information 126 corresponding to this ended query can be destroyed. Further, when an order of precedence is assigned to queries and scan processes, a disk rotation start command can be issued in accordance with this order of precedence.

According to the embodiment explained hereinabove, when a DBMS 118 does not execute DB processing which accords with a query, a disk device 152 of the storage system 140 is in a stopped state. Then, when a DBMS 118 receives a query, and DB processing information 520 prepared on the basis of the query plan of this query is inputted to the disk rotation instruction program 124, the disk rotation instruction program 124 specifies a soon-to-be-accessed logical unit from this DB processing information 520, a disk rotation start command is issued to the specified logical unit, and the disk of the disk device 152 on which this logical unit is constructed is thereby made to rotate. Then, when it is clear that an access will not be generated for this disk device 152, more specifically, when the query-based DB processing ends, a disk rotation stop command is issued to the logical unit constructed in accordance with this disk device 152, and the rotation of the disk of the disk device 152 on which this logical unit is constructed is thereby made to stop.

In other words, according to this embodiment, in a state wherein an access is not generated to a disk device 152, the rotation of the disk of the disk device 152 is in the stopped state, and when a soon-to-be-accessed logical unit is specified from DB processing information 520 based on a query plan, the rotation of disk device 152 on which this logical unit is located is started. This makes it possible to reduce the overall power consumption of the storage system 140.

Further, the rotation of the disk of a disk device 152 is carried out prior to an access actually being generated to this disk device 152. More specifically, a disk rotation start command 700 is issued to a logical unit constructed in accordance with a disk device 152 at a timing such that the rotation of this disk is in a stable state around the time an access is actually carried out to the disk of this disk device 152. This makes it possible to curb the degradation of the response rate of the storage system 140.

Therefore, according to this embodiment, it is possible to achieve both the reduction of the overall power consumption of the storage system 140, and the suppression of the degradation of the response rate of the storage system 140.

Further, according to this embodiment, although the degradation of the response rate of the storage system 140 is held in check, the response rate can still be slower than that of a storage system in which a disk device 152 is rotated at all times. For this reason, it is considered desirable that a DB system related to this embodiment be applied to a so-called archive system, in which accesses do not occur that frequently, rather than an online system in which the response rate (for example, the rate of data readout) is given top priority because accesses occur frequently.

Now then, a number of variations of the above-described embodiment can be considered. Respective variations will be explained hereinbelow.

Figure 12:
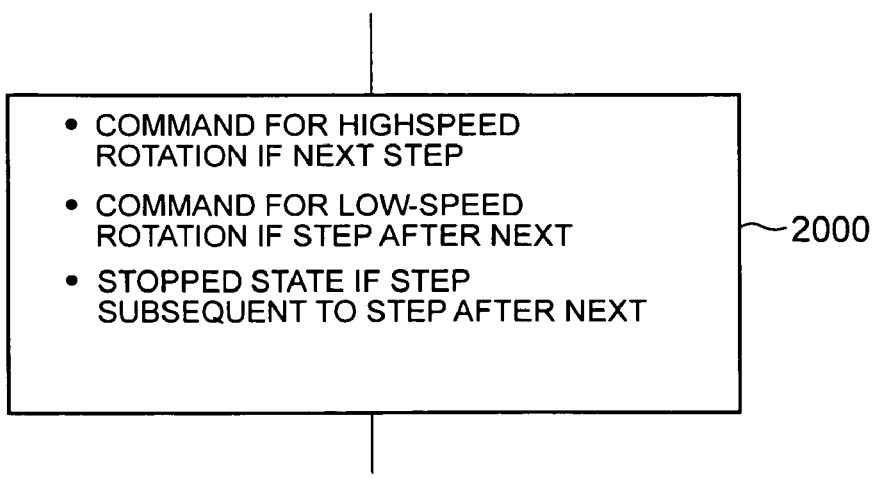
FIG. 12 shows one example of the timing for issuing a disk rotation start command based on the type of disk device rotation speed.

In a first variation, the configuration is such that the respective disk devices 152 can rotate a disk at a plurality of types of rotation speeds. More specifically, for example, the configuration is such that the disk devices 152 are capable of carrying out two type of rotation: high-speed rotation, which is the rotation speed at access time, and low-speed rotation, which is slower than that. The disk rotation instruction program 124, as illustrated in Step 2000 of FIG. 12, issues a disk rotation start command for executing high-speed rotation to a logical unit storing a DB schema to be accessed in the scan of the next step, issues a disk rotation start command for executing low-speed rotation to a logical unit storing a DB schema to be accessed in the scan of the step after next, and does not issue a disk rotation start command to a logical unit storing a DB schema to be accessed in the scan of the step subsequent to the step after next (This Step 2000, for example, can also be used in Steps 914 and 918 of FIG. 9). In this case, the disk device to be accessed in the scan of the next step waits to be accessed at high-speed rotation, the disk device to be accessed in the scan of the step after next waits to be accessed at low-speed rotation, and the disk device to be accessed in the scan of the step subsequent to the step after next is in the stopped state. This makes it possible to shorten the amount of time until the rotation of a disk device 152 becomes stable when scanning switches from the next step to the step after next, and, accordingly, makes it possible to contribute toward curbing the degradation of the response rate. Furthermore, in this variation, for example, rotation control can be carried out by including the data size of the DB schema, and the scan contents. For example, when the data size of DB schema targeted for access in the next step is greater than a prescribed value (in other words, when processing will take time), the disk device to be accessed in the scan of the step after next can be set to the stopped state vice low-speed rotation, and rotation starts after the next step scan begins (that is, after the scan of the step after next becomes the scan of the next step). Further, this rotation can be low-speed rotation at first, and then be set to high speed rotation when the state of progress specified from the DB processing execution information progresses beyond a prescribed state.

In a second variation, instead of the scan type being either a table scan or an index scan, another kind of type can be used, such as full search or partial search. Or, instead of schema size and scan type, another access size can be used. In other words, in the second variation, the disk rotation instruction program 124 can control the timing of the issuance of a disk rotation start command to a logical unit to be accessed in the scan of the next step based on the access size targeted by an access. For example, the disk rotation instruction program 124 can estimate the remaining amount of time until a single scan is complete from the access size, average per-second data transmission quantity, and state of progress, and if this remaining amount of time is shorter than the disk rotation startup time, a disk rotation start command can be issued to the logical unit to be accessed in the scan of the next step.

In a third variation, instead of a disk rotation stop command 710 being issued when the DB processing of a single query has ended, a disk rotation stop command 710 is issued at a suitable time during the DB processing of a single query. More specifically, for example, when a single scanning process has ended, and when it is specified from the DB processing information 520 that the logical unit accessed in this scanning process will not be accessed in the scanning process subsequent to the next step, or the step after next, the disk rotation instruction program 124 can issue a disk rotation stop command to this logical unit even during DB processing.

In a fourth variation, when a disk device 152 is capable of rotating at multiple rotation speeds, the disk rotation startup time to be written into the disk information 128 can be generated taking into account the aforesaid multiple rotation speeds. More specifically, for example, a disk rotation startup time from a stopped state to a high-speed rotation, and a disk rotation startup time from a low-speed rotation to a high-speed rotation can be prepared. In this case, the disk rotation instruction program 124 can change the type of disk rotation startup time to be referenced in accordance with whether this startup time will be from a low-speed rotation to a high-speed rotation, or from a stopped state to a high-speed rotation.

The embodiment of the present invention and a number of variations thereof have been explained hereinabove, but this embodiment and variations are simply examples for explaining the present invention, and do not purport to limit the scope of the present invention solely to these embodiment and variations. The present invention can be implemented in a variety of other modes without departing from the gist thereof. For example, a disk device can be configured so as to basically be in a stopped state or a low-speed rotation state, and the disk rotation instruction program 124 can issue a rotation instruction as needed. More specifically, for example, the configuration can be such that instead of stopping the rotation of a disk in accordance with a disk rotation instruction command from the disk rotation instruction program 124, the storage system 140 can stop the rotation of a disk after a fixed period of time has elapsed following the start of disk rotation in each disk device 152, and when the disk rotation instruction program 124 does not wish to stop the rotation of a disk, it can cause the rotation of the disk to continue by sending a disk rotation start command and increasing the count value corresponding to this disk.

What is claimed is:

1. A computer system, comprising:
    a storage system, the storage system comprising a plurality of disk devices comprising disks, and a disk access control part for controlling access to said plurality of disk devices, said plurality of disk devices storing a database (DB);
    a computer comprising a DB management information storage area operable to store DB management information for managing said DB, the computer operable to execute a database management system (DBMS) for operating said DB; and
    a disk rotation control part operable to control the rotations of said plurality of disk devices,
    the computer system operable to cause a disk of a disk device, which is not to be accessed, to rotate at a second rate of speed, which is zero or greater, and which is slower than a first rate of speed, which is the rotation speed at access time,
    wherein said DB comprises a plurality of DB schema, the DB schema being an element to be accessed by said DBMS;
    said DB management information comprises information denoting which DB schema is stored in which location;
    said DBMS is operable to receive a query, prepare a query plan for the received query, and, in accordance with the query plan, issue an access request to a DB schema specified from said DB management information; and
    said disk rotation control part, upon said DBMS receiving a query, is operable to specify, from the query plan of the query and said DB management information, the storage location of the DB schema to be accessed at the time the query is processed, and cause the disk of the disk device comprising this specified storage location to rotate at said first rate of speed.

2. The computer system according to claim 1, wherein, when said DBMS receives a query, said disk rotation control part is operable to specify, from the query plan of the query and said DB management information, all of the storage locations respectively corresponding to all of the DB schema to be accessed at the time the query is processed, and cause the disks of all of the disk devices respectively comprising all of the specified storage locations to rotate at said first rate of speed.

3. The computer system according to claim 1, wherein, when said DBMS finishes processing a query, said disk rotation control part causes the disks of all the disk devices that have been accessed for the query processing to rotate at said second rate of speed.

4. The computer system according to claim 1, wherein said disk rotation control part, based on an access request issued from said DBMS, is operable to recognizes the state of progress of the query processing, specify, from the recognized state of processing progress, a storage location of the DB schema to be accessed in a next step, and cause the disk of the disk device comprising the storage location to rotate at said first rate of speed.

5. The computer system according to claim 4, wherein said DB management information comprises the access size of each DB schema, and said disk rotation control part, using an access request from said DBMS, is operable to specify from said DB management information an access size corresponding to the DB schema to be accessed in accordance with the access request, and, based on the specified access size and said recognized state of processing progress, controls start timing for rotating the disk of the disk device, in which the DB schema to be accessed in the next step is stored, at said first rate of speed.

6. The computer system according to claim 5, wherein said disk rotation control part is operable to acquires, for the disk device storing the DB schema to be accessed in said next step, the amount of data to be transmitted per unit of time and the length of disk rotation startup time required for the rotation speed of a disk to reach said first rate of speed, specify the progress of the current step based on said access request and the access size corresponding to the DB schema being accessed in the current step, and, on the basis of the specified progress and said acquired amount of data to be transmitted per unit of time, predict the remaining amount of time required for the processing of the current step, and when the predicted remaining amount of time is less than said acquired disk rotation startup time, cause the disk of the disk device, in which the DB schema to be accessed in said next step is stored, to rotate at said first rate of speed.

7. The computer system according to claim 4, wherein said second rate of speed is zero, and said disk rotation control part is operable to specify the storage location of the DB schema to be accessed in a step after next from said recognized state of processing progress, and cause the disk of the disk device comprising the storage location to rotate at a third rate of speed, which is faster than said second rate of speed but slower than said first rate of speed.

8. The computer system according to claim 7, wherein said DB management information comprises the access size of each DB schema, and said disk rotation control part is operable to specify the access size of the DB schema to be accessed in said next step from said DB management information, and when the specified access size is greater than a prescribed value, does not cause rotation of the disk of the disk device, in which the DB schema to be accessed in said step after next is stored.

9. The computer system according to claim 1, wherein said storage system comprises a storage region operable to store a count value corresponding to each of said plurality of disk devices;

said disk rotation control part is operable to issues a first rotation control command when rotating the disk of a disk device at said first rate of speed; and said disk access control part, upon receiving said first rotation control command from said disk rotation control part, is operable to cause rotation of the disk of the disk device in accordance with the first rotation control command, and increases the count value corresponding to the first rotation control command, and at a prescribed timing, decreases this count value, and when the updated count value reaches the prescribed value, cause the disk of the disk device corresponding to the updated count value to rotate at said second rate of speed.

10. The computer system according to claim 9, wherein said disk rotation control part is operable to issues a second rotation control command when rotating the disk of a disk device at said second rate of speed; and said prescribed timing is when said disk access control part receives said second rotation control command from said disk rotation control part.

11. The computer system according to claim 1, wherein said disk rotation control part is operable to cause a disk of a disk device to rotate at said first rate of speed in scanning units rather than the step units that constitute a query plan.

12. The computer system according to claim 1, wherein said disk rotation control part is operable to cause a disk of a disk device to rotate at said second rate of speed in scanning units rather than the step units that constitute a query plan.

13. The computer system according to claim 1, wherein said disk rotation control part comprises a DB information acquisition part, and a disk rotation instruction part;

said DB information acquisition part is operable to acquires information related to the query plan of a query received by said DBMS and said DB management information, and, based on the information, specify a sequence of scans for the query, and a DB schema and the storage location thereof to be accessed on each scan, and sends DB processing management information, which is information denoting specified contents, to the disk rotation instruction part; and said disk rotation instruction part is operable to receives DB processing management information from said DB information acquisition part, and using the DB processing management information, specify the storage location of the DB schema to be accessed by a scan when said received query is processed, and cause the disk of the disk device comprising the specified storage location to rotate at said first rate of speed.

14. The computer system according to claim 13, wherein said DB processing management information comprises DB schema location information denoting the ID of each DB schema and the storage location of each DB schema, and DB processing information demotinig the sequence in which scanning is to be performed and which DB schema is to be accessed at which scanning step, and said DB information acquisition part, upon said DBMS being started up or said DB being changed, is operable to prepares said DB schema location information to be sent to said disk rotation instruction part, and upon said DBMS receiving a query, prepares said DB processing information to be sent to said disk rotation instruction part.

15. The computer system according to claim 1, wherein two or more logical units are allocated in said plurality of disk devices;

said storage system comprises a storage area for storing storage region management information denoting correspondence between a logical unit ID and a disk device ID;

said DB management information comprises DBMS management information, which denotes the ID of each DB schema and the storage location of each DB schema, and which is managed by said DBMS, and OS management information, which denotes correspondence between said storage location and a logical unit ID, and which is managed by an operating system (OS) of said computer;

said disk rotation control part, upon said DBMS receiving a query, is operable to acquires from said DBMS the storage location of the DB schema to be accessed when the query is processed, acquires from said OS a logical unit ID corresponding to the specified storage location, and issues a first rotation control command comprising said acquired logical unit ID; and said disk access control part is operable to receives said issued first rotation control command, specify from said storage region management information a disk drive ID corresponding to the logical unit ID within the received first rotation control command, and cause the disk of the disk device that corresponds to the specified disk device ID to rotate at said first rate of speed.

16. The computer system according to claim 1, wherein said disk rotation control part, based on an access request issued from said DBMS, is operable to recognizes the state of progress of the query processing, and upon specifying the end of processing of the current step from the recognized state of processing progress, cause the disk of the disk device accessed in the processing of the current step to rotate at said second rate of speed.

17. The computer system according to claim 16, wherein said disk rotation control part is configured such that, when said current step processing ends and the next step processing becomes the current step processing, said disk rotation control part does not set the rotation speed of the disk of the disk device accessed in the processing of the current step to said second rate of speed when the ended current step processing becomes the next step processing.

18. A method for reducing power consumption of a storage system implemented in a computer system comprising:
   a storage system comprising a plurality
   of disk devices comprising disks and a disk access control part operable to control access to said plurality of disk devices, the plurality of disk devices storing a database (DB); and
   a computer comprising a DB management information storage area for storing DB management information for managing said DB, and operable to executes a database management system (DBMS) for operating said DB,
      said DB comprising a plurality of DB schema accessed by said DBMS; and
      said DB management information comprising information denoting which DB schema is stored in which location,
   the method comprising the steps of:
      receiving a query, preparing a query plan for the received query, and, in accordance with the query plan, issuing an access request to a DB schema specified from said DB management information by said DBMS;
      upon said DBMS receiving a query, specifying, from the query plan of the query and said DB management information, the storage location of a DB schema to be accessed when the query is processed;
      causing a disk of a disk device comprising the specified storage location to rotate at a first rate of speed, which is the rotation speed at time of access; and
      causing a disk of a disk device for which an access is not to be generated to rotate at a second rate of speed, which is faster than zero and slower than said first rate of speed.

19. A computer, which comprises a plurality of disk devices comprising disks, and a disk access control part operable to control access to said plurality of disk devices, and which is connected to a storage system for storing a database (DB) in said plurality of disk devices, the computer further comprising:
   a DB management information storage area operable to store DB management information for managing said DB;
   a database management system (DBMS) operable to operate said DB; and
   a disk rotation control part operable to control rotation of said plurality of disk devices,
   wherein said DB comprises a plurality of DB schema accessed by said DBMS;
   said DB management information comprises information denoting which DB schema is stored in which location;
   said DBMS is operable to receives a query, prepares a query plan for the received query, and, in accordance with the query plan, issues an access request to a DB schema specified from said DB management information; and
   said disk rotation control part, upon said DBMS receiving a query, is operable to specify, from the query plan of the query and said DB management information, the storage location of a DB schema to be accessed when the query is processed, and cause a disk of a disk device comprising the specified storage location to rotate at a first rate of speed, which is the rotation speed at time of access, and rotates a disk of a disk device for which an access is not to be generated at a second rate of speed, which is faster than zero and slower than said first rate of speed.

20. A computer system, comprising:
   a storage system, which comprises a plurality of disk devices comprising disks as storage media, two or more logical units formed by said plurality of disk devices, a disk access control part operable to control access to said plurality of disk devices, a storage area operable to store a count value corresponding to each of said plurality of disk devices, and a storage area operable to store storage region management information denoting correspondence between a logical unit ID and a disk device ID, and which stores a database (DB) in said plurality of disk devices;
   a computer, which comprises a DB management information storage area operable to store DB management information for managing said DB, and which executes an operating system (OS), and a database management system DBMS) for operating said DB; and
   a disk rotation control part operable to control rotation of said plurality of disk devices,
   wherein a disk of a disk device for which an access is not to be generated is caused to rotate at a second rate of speed, which is zero or faster, and slower than a first rate of speed, which is the rotation speed at access time;
   said DB comprises a plurality of DB schema, accessed by said DBMS;
   said DB management information comprises DBMS management information, which denotes the ID of each DB schema and the storage location of each DB schema, and which is managed by said DBMS, and OS management information, which denotes correspondence between said storage location and a logical unit ID, and which is managed by said OS;

said DBMS is operable to receive a query, prepare a query plan for the received query, and, in accordance with the query plan, issue an access request to a DB schema specified from said DB management information;

said disk rotation control part, upon said DBMS receiving a query, is operable to acquires from said DBMS the storage location of a DB schema to be accessed when the query is processed, acquires from said OS a logical unit ID corresponding to the specified storage location, and issues a first rotation control command comprising said acquired logical unit ID; and said disk access control part, upon receiving said first rotation control command from said disk rotation control part, is operable to specify from said storage region management information the disk device ID corresponding to the logical unit ID within the received first rotation control command, cause a disk of the disk device corresponding to the specified disk device ID to rotate at said first rate of speed, and increases the count value corresponding to the disk device, decreases the count value at a prescribed timing, and, when an updated count value reaches a prescribed value, cause a disk of the disk device corresponding to the updated count value to rotate at a second rate of speed.

* * * * *